(12) United States Patent
Costa et al.

(10) Patent No.: US 9,390,261 B2
(45) Date of Patent: Jul. 12, 2016

(54) SECURING SOFTWARE BY ENFORCING DATA FLOW INTEGRITY

(75) Inventors: Manuel Costa, Cambridge (GB); Miguel Castro, Cambridge (GB); Tim Harris, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 1468 days.

(21) Appl. No.: 12/306,188

(22) PCT Filed: May 4, 2007

(86) PCT No.: PCT/US2007/010849
§ 371 (c)(1),
(2), (4) Date: Dec. 22, 2008

(87) PCT Pub. No.: WO2008/002350
PCT Pub. Date: Jan. 3, 2008

(65) Prior Publication Data
US 2009/0282393 A1  Nov. 12, 2009

(30) Foreign Application Priority Data
Jun. 23, 2006  (EP) .................................. 06116006

(51) Int. Cl.
*G06F 9/44*  (2006.01)
*G06F 21/54*  (2013.01)
*G06F 21/52*  (2013.01)

(52) U.S. Cl.
CPC ................ *G06F 21/54* (2013.01); *G06F 21/52* (2013.01)

(58) Field of Classification Search
None
See application file for complete search history.

(56) References Cited

U.S. PATENT DOCUMENTS

| 4,558,176 A | 12/1985 | Arnold et al. |
| 4,920,538 A | 4/1990 | Chan et al. |

(Continued)

FOREIGN PATENT DOCUMENTS

| EP | 0606802 A1 | 7/1994 |
| EP | 1507185 A1 | 2/2005 |

(Continued)

OTHER PUBLICATIONS

Abadi et al., "Control Flow Integrity: Principles, Implementations, and Applications," CCS'05, Nov. 7-11, 2005, Alexandria, Virginia, USA, retrieved at <<http://www.cs.princeton.edu/~jligatti/papers/cficcs.pdf>>, 14 pages.

(Continued)

*Primary Examiner* — Evral E Bodden
(74) *Attorney, Agent, or Firm* — Tom Wong; Micky Minhas; Zete Law, P.L.L.C.

(57) ABSTRACT

The majority of such software attacks exploit software vulnerabilities or flaws to write data to unintended locations. For example, control-data attacks exploit buffer overflows or other vulnerabilities to overwrite a return address in the stack, a function pointer, or some other piece of control data. Non-control-data attacks exploit similar vulnerabilities to overwrite security critical data without subverting the intended control flow in the program. We describe a method for securing software against both control-data and non-control-data attacks. A static analysis is carried out to determine data flow information for a software program. Data-flow tracking instructions are formed in order to track data flow during execution or emulation of that software. Also, checking instructions are formed to check the tracked data flow against the static analysis results and thereby identify potential attacks or errors. Optional optimisations are described to reduce the resulting additional overheads.

20 Claims, 8 Drawing Sheets

(56) References Cited

U.S. PATENT DOCUMENTS

| | | | |
|---|---|---|---|
| 5,421,006 A | 5/1995 | Jablon et al. | |
| 5,477,858 A * | 12/1995 | Norris et al. | 600/441 |
| 5,826,013 A * | 10/1998 | Nachenberg | 726/22 |
| 5,867,647 A | 2/1999 | Haigh et al. | |
| 6,247,036 B1 * | 6/2001 | Landers et al. | 708/603 |
| 6,286,075 B1 * | 9/2001 | Stracovsky et al. | 711/5 |
| 6,748,590 B1 * | 6/2004 | Martin | G06F 7/523 |
| | | | 708/627 |
| 6,775,780 B1 | 8/2004 | Muttik | |
| 6,802,006 B1 | 10/2004 | Bodrov | |
| 6,931,548 B2 | 8/2005 | O'Connor | |
| 6,981,279 B1 | 12/2005 | Arnold et al. | |
| 7,051,322 B2 | 5/2006 | Rioux | |
| 7,163,273 B2 * | 1/2007 | Silverbrook | B41J 2/14427 |
| | | | 347/19 |
| 7,952,587 B2 * | 5/2011 | Hansen et al. | 345/522 |
| 7,962,901 B2 * | 6/2011 | McCamant et al. | 717/131 |
| 8,269,784 B2 * | 9/2012 | Hansen et al. | 345/522 |
| 2002/0078381 A1 | 6/2002 | Farley et al. | |
| 2003/0115479 A1 * | 6/2003 | Edwards et al. | 713/200 |
| 2004/0025015 A1 | 2/2004 | Satterlee et al. | |
| 2004/0123137 A1 | 6/2004 | Yodaiken | |
| 2005/0108562 A1 * | 5/2005 | Khazan et al. | 713/200 |
| 2005/0144471 A1 | 6/2005 | Shupak et al. | |
| 2005/0154900 A1 * | 7/2005 | Muttik | 713/188 |
| 2005/0262557 A1 | 11/2005 | Fellenstein et al. | |
| 2005/0278783 A1 | 12/2005 | Chien et al. | |
| 2006/0021032 A1 | 1/2006 | Challener et al. | |
| 2008/0126758 A1 * | 5/2008 | Kwon | G06F 9/3001 |
| | | | 712/221 |
| 2008/0155342 A1 * | 6/2008 | O'Callahan | 714/38 |

FOREIGN PATENT DOCUMENTS

| | | |
|---|---|---|
| WO | WO0054155 A1 | 9/2000 |
| WO | WO0142874 A2 | 6/2001 |

OTHER PUBLICATIONS

Costa et al., "Vigilante: End-to-End Containment of Internet Worms," SOSP'05, Oct. 23-26, 2005, Brighton, United Kingdom. retrieved at <<http://research.microsoft.com/research/sv/sv-pubs/VigilanteSOSP.pdf>>, 15 pages.

Cowan et al., "Buffer Overflows: Attacks and Defenses for the Vulnerability of the Decade," IEEE 1999, 11 pages.

EP Search Report, EP 06 11 606, Jul. 24, 2006, 8 pages.

EP Communication in EP Application No. 06116006.5-1245 dated Jun. 20, 2008, 2 pages.

EP Communication in EP Application No. 06116006.5-1245 dated Jul. 8, 2011, 5 pages.

Necula et al., "CCured: Type-Safe Retrofitting of Legacy Code," Published in the Proceedings of the Principles of Programming Languages, 2002, pp. 128-139, retrieved at <<http://www.eecs.umich.edu/~bchandra/courses/papers/Necula_CCured.pdf>>, 12 pages.

Newsome, et al., "Dynamic Taint Analysis for Automatic Detection, Analysis, and Signature Generation of Exploits on Commodity Software," retrieved at <<http://www.ece.cmu.edu/~jnewsome/docs/taintcheck.pdf>>, 2005, 17 pages.

The PCT Search Report mailed Oct. 30. 2007 for PCT application No. PCT/US2007/010849, 7 pages.

Wagner et al., "Instrusion Detection via Static Analysis," IEEE, 2001, 14 pages.

* cited by examiner

SECURING SOFTWARE BY ENFORCING DATA FLOW INTEGRITY

RELATED APPLICATIONS

This application is a National Stage of International Application No. PCT/US2007/010849, filed 4 May, 2007, which claims priority from European Patent Application No. 06116006.5, filed on 23 Jun. 2006. Both applications are incorporated herein by reference.

TECHNICAL FIELD

This description relates in general to the field of computer programming. More particularly, this description relates to the protection of an attack against a computer application or system component; it is particularly related to, but in no way limited to, securing software by enforcing data-flow integrity. It is also related to making software more reliable by discovering programming errors, even when such errors are not exploited by attacks.

BACKGROUND

Most software is written in unsafe languages such as C and C++ in which buffer overflows, format string vulnerabilities, and other vulnerabilities are possible and can be exploited by attackers such that a security or privacy violation is possible. Even programs written in type-safe languages have libraries and runtimes written in unsafe languages. Therefore, current software is vulnerable to a variety of attacks and it is likely to remain vulnerable in the foreseeable future.

The majority of such software attacks exploit software vulnerabilities or flaws to write data to unintended locations. For example, control-data attacks exploit buffer overflows or other vulnerabilities to overwrite a return address in the stack, a function pointer, or some other piece of control data. Non-control-data attacks exploit similar vulnerabilities to overwrite security critical data without subverting the intended control flow in the program. Non-control-data attacks are thought to be less frequent than control-data attacks but they are equally serious and at present no good defenses against them are known.

Previously it has been proposed to use memory-safe dialects of C that prevent software attacks. However, these approaches require existing C code to be ported to these dialects which is a non-trivial task and significant changes to the C runtime occur.

Other known approaches can be applied to existing programs but these typically cannot defend against non-control-data attacks and/or have false positives and incur a very high overhead without hardware support.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The majority of software attacks exploit software vulnerabilities or flaws to write data to unintended locations. For example, control-data attacks exploit buffer overflows or other vulnerabilities to overwrite a return address in the stack, a function pointer, or some other piece of control data. Non-control-data attacks exploit similar vulnerabilities to overwrite security critical data without subverting the intended control flow in the program. We describe a method for securing software against both control-data and non-control-data attacks. A static analysis is carried out to determine data flow information for a software program. Data-flow tracking instructions are formed in order to track data flow during execution or emulation of that software. Also, checking instructions are formed to check the tracked data flow against the static analysis results and thereby identify potential attacks or errors. Optional optimisations are described to reduce the resulting additional overheads.

The present example provides a method comprising:
 providing access to the results of a static analysis of a software program the static analysis results comprising data flow information;
 forming data-flow tracking instructions in order to track data flow within the software; and
 forming checking instructions in order to check the tracked data flow against the static analysis results and thereby identify potential flaw in the software program.

By enforcing data flow integrity in this way we are able to detect both control-data attacks and non-control data attacks. In contrast, known methods which seek to enforce control-flow integrity are only able to protect against control-data attacks. The term "flaw in a software program" is used to refer to either potential attacks on a software program and/or programming errors in the software program.

A corresponding apparatus is provided comprising:
 an input arranged to access the results of a static analysis of a software program the static analysis results comprising data flow information;
 a processor arranged to form data-flow tracking instructions in order to track data flow within the software; and
 a processor arranged to form checking instructions in order to check the tracked data flow against the static analysis results and thereby identify potential flaws in the software program.

In another example, we provide a method carried out by an end user of a software program which has been arranged to enforce data-flow integrity. For example, a method comprising
 accessing the results of a static analysis of a software program the static analysis results comprising data flow information;
 tracking data flow in the software program during execution or emulation of that software program; and
 checking the tracked data flow against the static analysis results and making an indication if a mismatch is found.

A corresponding apparatus is provided.

An apparatus comprising:
 an input arranged to access the results of a static analysis of a software program the static analysis results comprising data flow information;
 a processor arranged to track data flow in the software program during execution or emulation of that software program; and
 wherein the processor is also arranged to check the tracked data flow against the static analysis results and making an indication if a mismatch is found.

Preferably the data flow tracking instructions and the checking instructions are added to the software using any of a modified compiler and a binary re-write tool. In another example, those instructions are implemented using any of a machine emulator arranged to emulate a processor executing the software program and a hardware equivalent of the machine emulator.

Preferably the potential attacks comprise both control-data attacks and non-control-data attacks.

For example, the static analysis results comprise, for each value read by an instruction in the software program, a set of instructions from the software program that may write that value.

In some embodiments the method further comprises carrying out the static analysis of the software program by computing reaching definitions from source code of the software program.

Preferably the data flow tracking instructions are arranged to maintain a mapping between identifiers and memory positions, the identifiers being of the last instruction to write to each of the memory positions.

For example, the checking instructions instrument read instructions.

Preferably the read instructions are instrumented to check if an identifier of the instruction that wrote the value being read is an element of an associated set computed by the static analysis.

In an embodiment the method further comprises determining equivalence classes of instructions and assigning the same identifier to all the instructions in the same class.

In an example the method comprises removing some of the data-flow tracking instructions and some of the checking instructions on the basis of a second static analysis.

An example provides a computer program comprising computer program code means adapted to perform all the steps of any of the methods described above when said program is run on a computer. For example, the computer program is embodied on a computer readable medium.

With regard to the apparatus examples:

The apparatus for example comprises a compiler arranged to carrying out the static analysis of the software program by computing reaching definitions from source code of the software program.

Preferably the processor is arranged to form the data flow tracking instructions in order to maintain a mapping between identifiers and memory positions, the identifiers being of the last instruction to write to each of the memory positions.

Preferably the processor is arranged to add the checking instructions such that they instrument read instructions.

Preferably the processor is arranged to form the checking instructions for each read instruction to check if an identifier of the instruction that wrote the value being read is an element of an associated set computed by the static analysis.

The methods may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions, (and therefore the software essentially defines the functions of a software security system, and can therefore be termed a software security system, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions. For the avoidance of doubt, the invention encompasses implementations in which any part of the system is implemented in hardware rather than software.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

We recognize a need to protect software programs against both control-data attacks and non-control-data attacks. We provide a method for achieving this which operates by enforcing data-flow integrity. For better understanding of control-data attacks and non-control data attacks an example is discussed with reference to FIGS. 1, 1b and 1c.

Figure 1:
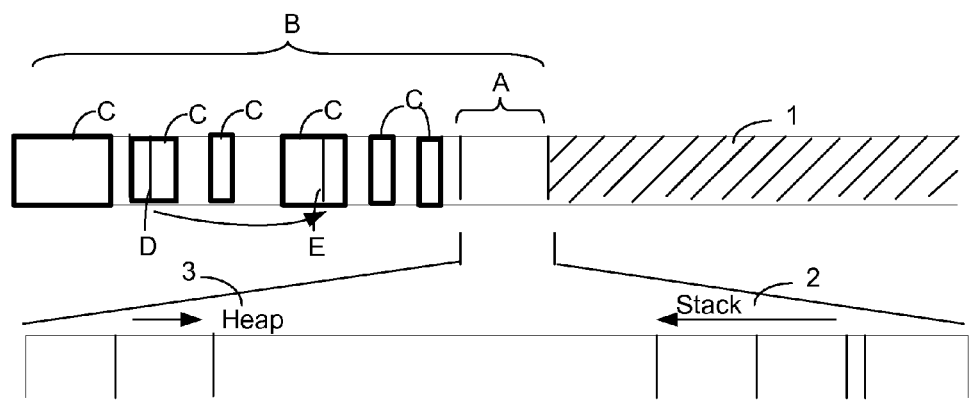
FIG. 1 is a schematic diagram of memory used by a computer.
Figure 1B:
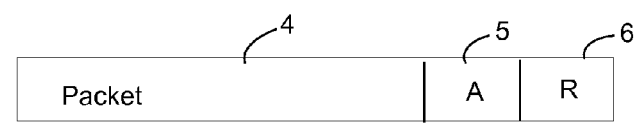
FIG. 1b is a schematic diagram of part of a stack.
Figure 1C:
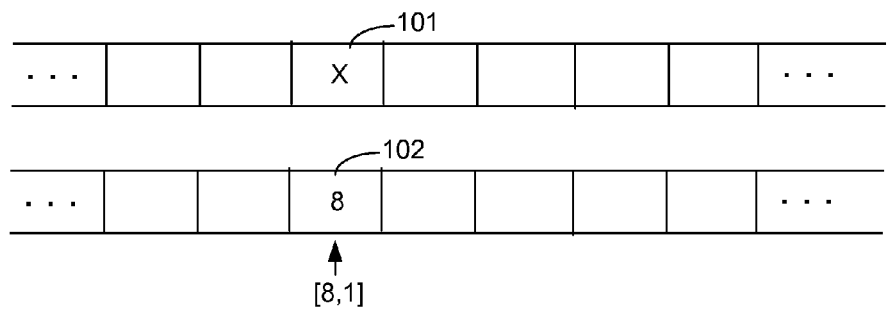
FIG. 1c is a schematic diagram of part of a computer memory.

FIG. 1 is a schematic diagram of part of a computer memory comprising operating system dedicated memory 1, user memory B and available memory A (as seen by computer processor). The operating system memory 1 is unavailable for any other use apart from by the operating system of the computer. The user memory is available for software applications installed by a user for example with some blocks of memory being taken up for this purpose in the FIG. 1 example (see blocks C). Available memory A is shown in more detail in the lower part of FIG. 1. it comprises a stack 2 and a heap 3 which are filled in the direction of the arrow and can be thought of as working memory of the computer. The computer memory can be thought of schematically using a "pigeon hole" memory model whereby items of information are stored at memory locations each having a unique address or identifier. For example FIG. 1c illustrates two rows of such pigeon holes.

Consider now an example code fragment written in the computer programming language C and given below.

```
1: int authenticated = 0;
2: char packet [1000];
3:
4: while (!authenticated) {
5:    PacketRead(packet);
6:
7:    if (Authenticate(packet))
8:        authenticated = 1;
9: }
10:
11: if (authenticated)
12:    ProcessPacket(packet);
```

This comprises 12 lines of code numbered 1 though 12. In line 1 an integer variable is defined and set at the value zero. In line 2 a 1000 byte array of character values called packet is set up and 1000 bytes of memory is allocated for use by this array. A while loop then begins at line 4 and continues until line 9. The while loop is conditional on the value of the variable authenticated being zero. At this point the value of authenticated is zero having just been set to zero in line 1. We then proceed to line 5 and perform a function PacketRead on the argument packet. This function reads in a packet to the array packet already defined in line 2. At line 7 we call a function Authenticate to check the read in packet and if the result is successful, set the value of the variable authenticated to 1 (see line 8). At lines 11 and 12 we then process the authenticated packet using a function ProcessPacket. However, assume that the function PacketRead is able to write more than 1000 bytes to packet, as is the case in many computer languages such as C and C++. This vulnerability can be exploited to overwrite the return address of the function PacketRead or to overwrite authenticated. This is now explained with reference to FIGS. 1 and 1b. Suppose that the software application comprising the 12 lines of code above is stored in user memory B of FIG. 1 and say line 5 which calls the function PacketRead is stored at D. This line calls function PacketRead which for example is stored at E. As a result of calling PacketRead at E a packet is read in and stored on the stack for example as 4 in FIG. 1b with a value of the variable authenticated previously stored at 5 on the stack and a value R for the return address (address of D, the instruction which called PacketRead and to which the flow of control is to return to) stored at 6 on the stack. If the packet read in is larger than 1000 bytes it can overwrite memory locations 5 and 6 in FIG. 1b. By overwriting the return address R an attacker is able to prevent the program from going back to line 5 and continuing with the program. The attacker could divert the flow of control of the program to other parts of memory and thus breach security and/or privacy. This is a form of control-data attack that may allow the attacker to gain control over the execution. By overwriting the value of the variable authenticated an attacker is able to cause the while loop to stop iterating instead of iterating until authentication is successful. The attacker is then able to have its packet processed without proper authentication. This is a form of non-control data attack.

Figure 2:
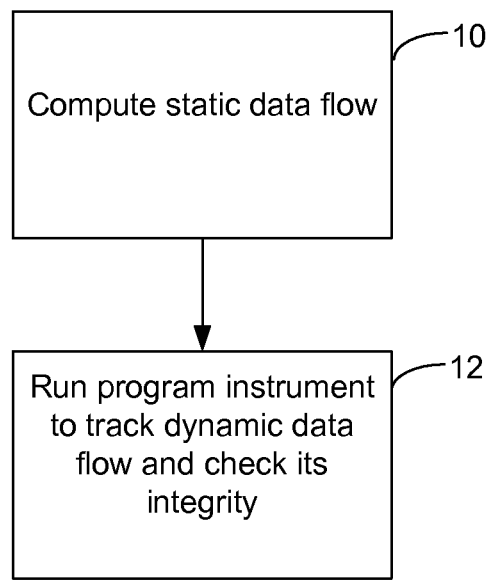
FIG. 2 is a flow diagram of a method of securing software.

As mentioned above our approach comprises enforcing data flow integrity. At a high level our method comprises computing or accessing a pre-computed static data flow (see box 10 of FIG. 2) and running a program instrumentation process (see box 12 of FIG. 2) in order to instrument the program (add instructions to it) for tacking dynamic data flow and for checking integrity of that dynamic data flow. The instrumentation comprises adding data flow tracking instructions to track the dynamic data flow. It also comprises adding checking instructions to check the dynamic data flow against the static data flow information. The instrumented program can then be run and will raise an exception, alert or stop working if data-flow integrity is violated.

The static analysis comprises determining data-flow information for a given software program. For example, for each program location (such as a line number in the code example above) the static analysis computes a set of program locations that may write the value at the program location concerned. So for example, program location line 4 comprises the variable authenticated. This variable may have been written to at line 1 or line 8. Thus the static analysis results for line 4 comprise a set {1,8} and for line 11, also {1,8}. Sets of program locations are produced in this manner, in a simplified example, for each line number to give the complete static analysis results. More generally, the static analysis is said to compute, for each value read by an instruction, a set of instructions that may write that value. As described in more detail below, the static analysis results sets are, in a particular example, associated with instructions in a compiler's intermediate representation of the program, rather than with the source code line numbers. The source code line numbers are referred to above for the sake of clarity.

Any suitable method of computing these sets of values can be used. For example, reaching definitions analysis can be used as described by Aho, Sethi and Ullman "Compilers: Principles, Techniques and Tools" 1986 Addison Wesley ISBN 0-201-10194-7. Reaching definitions analysis as set out by Aho et al introduces the following language. An instruction that writes to a memory position defines the value in the memory position, and an instruction that reads the value from the memory position is said to use the value. The analysis computes the set of reaching definitions for each use. It assigns an identifier to each definition and returns the set of reaching definition identifiers for each use.

For example, authenticated is used in lines 4 and 11. If we ran reaching definitions analysis in the source code, it might conclude that the definitions in lines 1 and 8 reach both uses. Therefore, the set of reaching definition identifiers for both uses would be {1,8}, if we used the line numbers to identify the definitions.

The analysis can be imprecise but it is important that it be conservative. It must include in the set all definitions that may reach a use at runtime but it may include additional definitions. For example, only the definition in line 8 can reach the use in line 11 but the analysis might compute the set of reaching definitions {1,8}. This is important to ensure that data-flow integrity enforcement has no false positives.

As mentioned above the program to be secured is instrumented (e.g. by adding instructions) to track the data flow and check that the tracked data flow complies with the static analysis results. The process of adding instructions, referred to herein as instrumentation, is achieved using any of a modified compiler, a binary rewrite tool, a machine emulator, dedicated hardware or in any other suitable way. In other words, the program is instrumented to compute the definition that reaches each read at runtime and to check if this definition is in the set of reaching definition identifiers that was computed statically. To compute reaching definitions at runtime, we maintain a runtime definitions table (RDT) that records the identifier of the last instruction to write to each memory position. Every write is instrumented to update the RDT. The instrumentation before reads uses the address of the memory position being read to retrieve the identifier from the RDT. Then, it checks if this identifier is in the statically-computed set. For example, in the C code fragment example above we would add code to set RDT[&authenticated] to 8 in line 8, and to check if RDT[&authenticated] ∈{1,8} in lines 4 and 11.

This is now explained schematically with reference to FIG. 1c. Suppose that line 8 of the example program above is reached and the value of the variable authenticated is set to 1. This comprises writing a value to memory to represent the value of the variable. For example, X is written to memory location 101 as indicated in FIG. 1c. Suppose that related memory is formed, indicated by the lower row of pigeon hole memory in FIG. 1c. In a memory location 102 which is associated with memory location 101 we store information about the program location line 8, at which the instruction to write to the variable authenticate occurred. This information stored in the related memory is an example of the data flow tracking information. In order to store this information in the related memory data flow tracking instructions are added to the example program.

Later in the execution of the program line 11 is reached. At this line an instruction is given to read the value of authenticated. Before making this read a check is made that the entry at memory location 102 in the related memory is consistent with the static data flow information. This check is made using checking instructions added to the program. As described above, the static data flow information comprises for each program location (e.g. line) a set of line numbers from which a value at the current line may have been written. In the case of line 11 the set of values is {1,8} as indicated in FIG. 1c. These line numbers 1, 8 are examples of reaching definition identifiers described in more detail below. Because the entry in memory location 102 (corresponding to memory location 101) contains a value that is a member of this set, no indication needs to be made in this case. However, if an attack had occurred, as described above, the value of the variable authenticated and/or the return address of PacketRead may have been overwritten (for example).

In this case the value in related memory location 102 is z rather than 8 as in FIG. 1c. This is because at line z the PacketRead function writes to memory location 101 when the variable authenticated is overwritten. Therefore at or immediately before line 11 an exception is raised because the value z is not a member of the appropriate static analysis results set {1,8}. By overwriting the return address of PacketRead the program execution does not return to line 6 after computing line 5. However, this error is detected because before the program reads the return address a check is made in the related memory in a similar manner as described for the variable authenticated. This check flags up an error because the program location from which the return address is read has value z in the related memory location that corresponds to the return address. As described later, this related memory location is set to zero on function entry and a check whether it is zero is added on function return. This check fails when the attack overwrites the return address because the associated related memory has value z.

Thus in FIG. 1c the 'related' memory represented by the lower line of pigeon holes is an example of part of a runtime definitions table (RDT) as mentioned above.

In order to enforce data-flow integrity in the presence of a strong attacker that can write anywhere and that can even execute data, we prevent tampering with the RDT, tampering with the code, or bypassing the instrumentation. This is achieved in any suitable manner.

For example, RDT tampering is prevented by instrumenting writes to check if the target address is within the memory region allocated to the RDT. Any attempt to write to the RDT generates an exception. In another example, code tampering is prevented with the same checks or by using read-only protection for code pages.

Another method of protecting the RDT comprises modifying the program so that none of the addresses written can refer to the memory containing the RDT. For example, if the RDT is held at address 4000000h and no other program-accessible data structure is above 4000000h, then the RDT could be protected by logically ANDing each address to be written by the program with 3FFFFFFh.

To prevent the attacker from bypassing the instrumentation, we prevent tampering with the target addresses of indirect control flow transfers. We instrument writes and reads of programmer-defined control data as described before. In addition, we instrument writes and reads of control data added by a compiler in the same way. For example, we set the RDT entry for a return address to a well known value and we check if the entry still holds the value on return.

Overheads are increased relative to those for the un-instrumented software. For example, for each write to memory another write to the related memory (FIG. 1c occurs). However, it is possible to tradeoff coverage for lower overhead. If the data-flow graph does not specify reaching definitions for some uses, some attacks may go undetected because those uses are not instrumented but the overhead will be lower. We can still ensure data-flow integrity if uses of control data are instrumented. In an example our method only instruments uses of local variables without definitions external to the function and uses of control data. This example is interesting because it has low overhead and it can still catch many interesting attacks. For example, it can prevent any attack that violates control-flow integrity and the non-control-data attack example mentioned above.

When the instrumented program runs, any deviation from the data-flow graph computed statically raises an exception. Since the analysis is conservative, there are no false positives. If there is an exception, the program has an error which is a potential attack or programming error.

Figure 4:
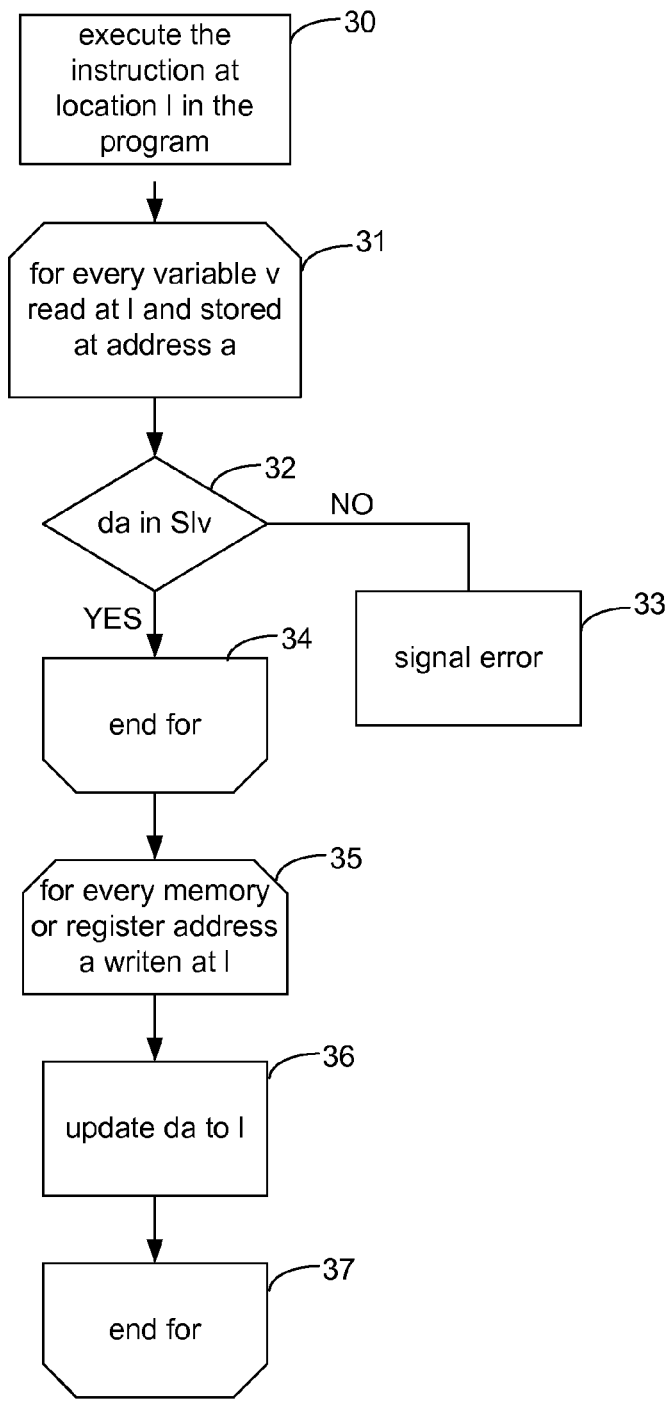
FIG. 4 is a flow diagram of a method of maintaining a mapping data structure and checking integrity of a software program.

FIG. 4 is a flow diagram of a method of maintaining a mapping data structure and checking integrity of a software program. The upper part of this flow diagram relates to the integrity checking process and the lower part to the data-flow tracking process as now explained. An instruction at location 1 in the software program to be secured is executed (see box 30). For every variable v read at that program location 1 and stored at address a (see box 31) a check is made to see whether the entry da in the corresponding related memory is a member of the set of program locations determined during the static analysis for the appropriate program location (see box 32). If a discrepancy is found an error is signalled (see box 33). The error is signalled in any suitable way. For example, an exception is raised, the process is terminated or a write is made to a debugging log. If the check is successfully passed for each variable at 1 (see end for box 34) then we proceed to the data tracking process. This comprises, for every memory or register address a written at program location 1, updating the contents of the appropriate related memory location to 1 (see box 36, update da to 1). An "end for" process (see box 37) completes the process.

As mentioned above the instrumentation can be achieved using a modified compiler or a binary rewrite tool. It is also possible to use a machine emulator or a hardware equivalent of a machine emulator. These examples are now described in more detail with reference to FIGS. 5 to 8. In each of these examples the compiler, binary rewrite tool, machine emulator or hardware equivalent are implemented using a suitable computer together with suitable operating system software as known in the art.

Figure 5:
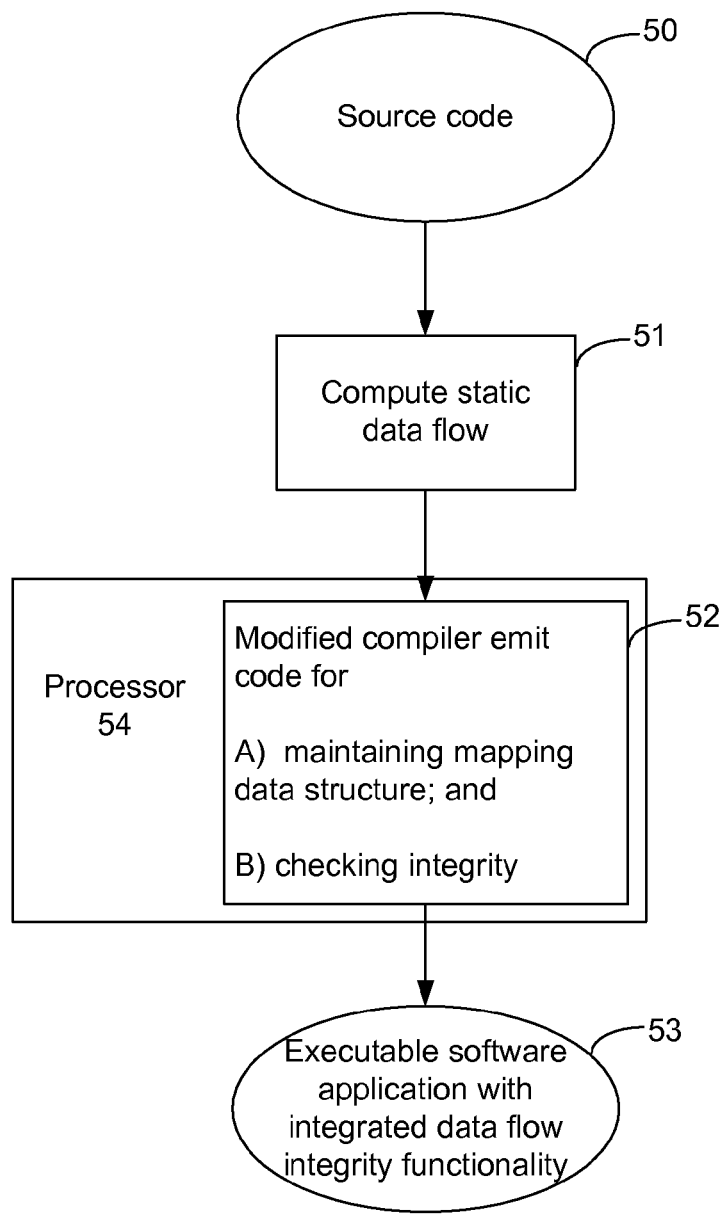
FIG. 5 is a schematic diagram of a modified compiler for securing software.

FIG. 5 a schematic diagram of a modified compiler for securing software. Source code 50 of the software program to be secured is input to a process to carry out a static analysis and compute a static data flow (see box 51). This information about data flow from the static analysis is provided to the modified compiler 52 which has an associated processor 54. The modified compiler emits code every time a register or memory address a is written. This code maintains a data structure that maps each register or memory address a to the identifier da of the program location that wrote the current value of the register or memory cell in the dynamic execution (as explained above). In addition, the compiler emits code to check the integrity of data flow every time a variable v stored at memory or register address a is used at some location 1. This code checks whether da is one of the locations in Slv. It looks up the value of da in the data structure and checks if it is in Slv. The identifiers of the locations in Slv can be embedded in the code or they can be looked up in a table that maps variables and locations to sets of locations. The first approach is able to yield especially good performance and prevents an attacker from overwriting the table. In either case, if the check fails the emitted code signals an error, for example, by raising an exception.

The output of the modified compiler is executable software 53 with integrated data flow integrity functionality. In this way, existing source code can be provided with data flow integrity functionality in a simple and effective manner.

Figure 6:
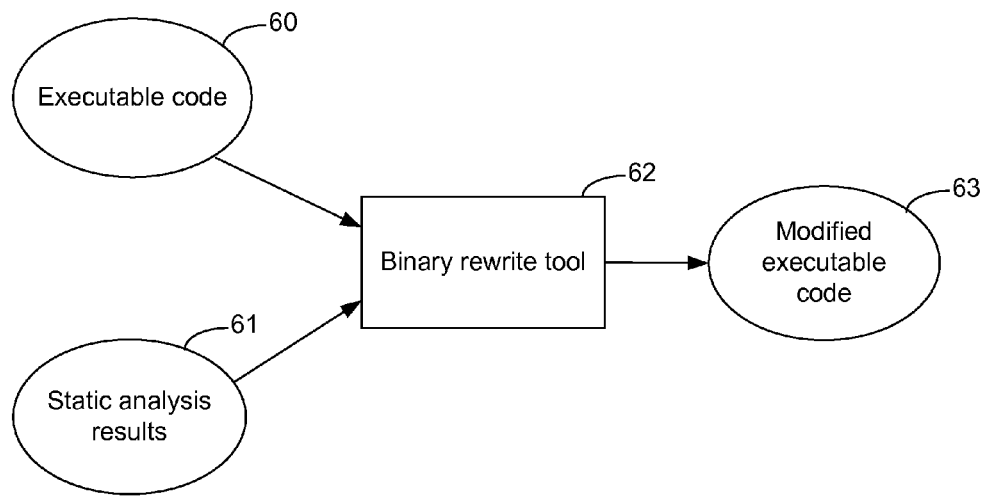
FIG. 6 is a schematic diagram of a binary re-write tool for securing software.

FIG. 6 is a schematic diagram of a binary rewrite tool 62 for securing software. This takes executable code 60 as input and also has access to results of a static analysis 61 as described above. In this example, the static data flow information 61 is used to drive the binary rewrite tool 62 to emit code to check the integrity of the dynamic data flow as described for the compiler-based implementation above. In this way it is possible to add data flow integrity functionality to previously released binaries. The output of the binary rewrite tool 62 comprises modified executable code 63.

Figure 7:
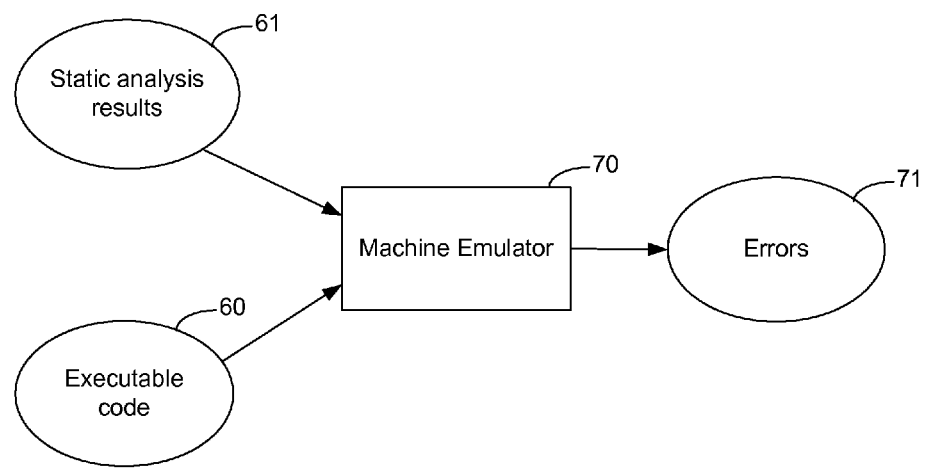
FIG. 7 is a schematic diagram of a machine emulator for securing software.
Figure 8:
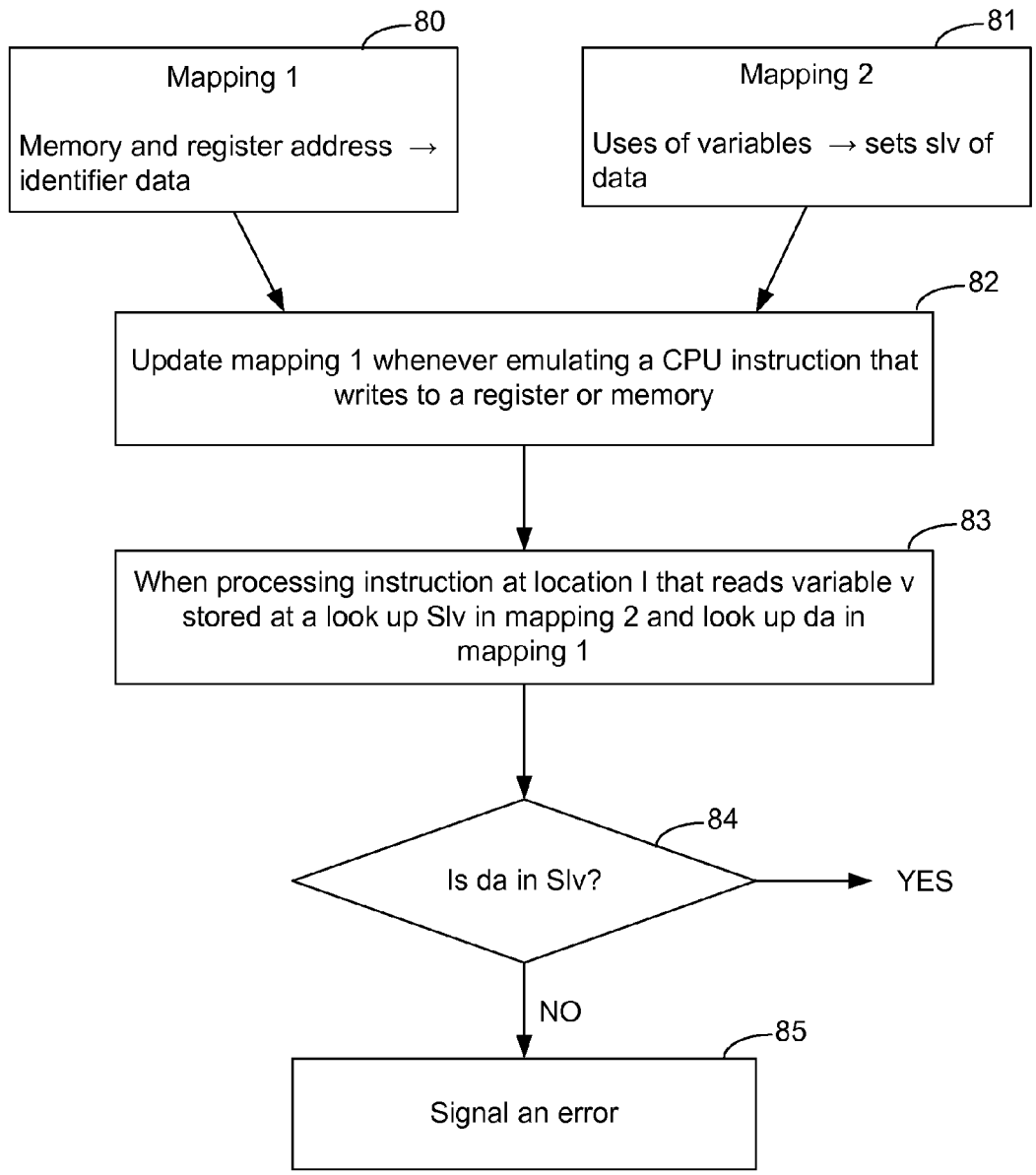
FIG. 8 is a flow diagram of a method of using the machine emulator of FIG. 7 for securing software.

FIG. 7 is a schematic diagram of a machine emulator 70 for securing software. This takes static data flow information 61 as input as well as executable code 60 for securing. The machine emulator 70 emulates execution of the software and raises errors or exceptions 71. This approach can be used to add detection to previously released binaries. As now explained with reference to FIG. 8, the machine emulator maintains two data structures 80, 81. A first data structure 80, mapping 1, maps each memory and register address a to the identifier da and it updates this data structure whenever it emulates a CPU instruction that writes to a register or memory (see box 82). The machine emulator also keeps a second data structure 81 (mapping 2) which maps uses of variables to the sets Slv or locations that static analysis determined may write the value used. When the emulator processes an instruction at location 1 that reads a variable v stored at register or memory address a, it looks up Slv in mapping 2 and the location da where the variable was last written in the first data structure, mapping 1 (see box 83). If da is not in Slv (see box 84) the emulator signals an error (see box 85), for example, by calling an appropriate error handler.

In another embodiment the data flow integrity functionality is implemented in hardware using the same technique as described above for the machine emulator, or any other suitable technique. This approach enables data flow integrity functionality to be added to previously released binaries.

By using any of the methods described with reference to FIGS. 5 to 8 we can protect software programs from attacks. It is not necessary to port old applications or to write new applications using particular safe dialects. We are also able to protect all the flows of data in programs rather than just specific parts of programs such as function pointers. We are also able to succeed against attacks that do not change the control flow of the target program. Advantageously particular embodiments of our method do not generate false positives. More detail about the static analysis is now given.

Static Analysis

Figure 3:
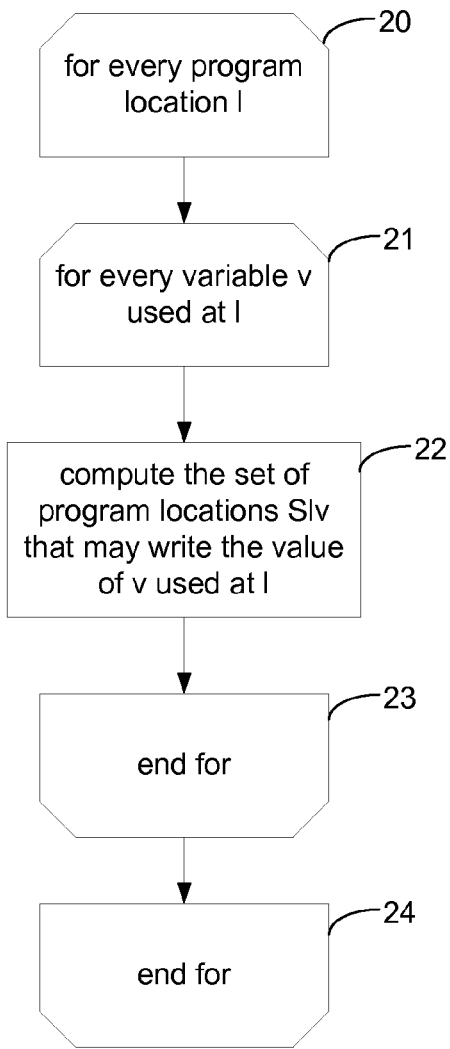
FIG. 3 is a flow diagram of a method of static analysis.

As mentioned above the static analysis comprises data-flow information such as, for each value read by an instruction, information about a set of instructions that may write that value. FIG. 3 is a flow diagram of an example method of static analysis.

For every program location 1 (see box 20) and for every variable v used at that program location 1 (see box 21) information is obtained about a set of program locations Slv. For example, the set of program locations Slv that may write the value of v used at 1. In some examples we use information about classes of program location or other information about the program locations as described in more detail later. Two "end for" statements (see boxes 23 and 24) are shown in FIG. 3 for completeness.

As mentioned above, the step of computing the information about set of program locations may comprise using reaching definitions analysis. In a particular example we use a combination of two analyses: a flow sensitive intra-procedural analysis and a flow-insensitive and context-insensitive inter-procedural analysis.

The intra-procedural analysis takes flow control into account. In an example, it may be implemented by traversing static single assignment representation as described in Appel, A. W. "Modern Compiler Implementation in Java" Cambridge University Press, 1998. We use this analysis to compute reaching definitions for uses of local variables that have no definitions external to the function in which they are declared. The inter-procedural analysis is used to compute reaching definitions for all other uses.

The inter-procedural analysis is less precise to allow it to scale to large programs. It ignores control flow and it does not take the calling context into account when analyzing functions. We implemented points-to analysis to compute the set of objects that each pointer can point to, and we use these points-to sets to compute reaching definitions. Points-to analysis is described in Andersen, L. "Program Analysis and Specialisation for the C Programming Language" PhD thesis, University of Copenhagen, 1994. However, it is not essential to use points-to analysis, any suitable method of computing the set of objects that each pointer can point to can be used.

For example, the points-to analysis is field-insensitive rather than field-based (i.e. it does not distinguish between the different fields in a structure, union, or class). This analysis makes a global pass over all source files to collect subset constraints. Each assignment x=y results in a subset constraint $x \supseteq y$, which means that the set of possible values of x contains the set of possible values of y. The analysis uses a compiler to compile each source file to a high level intermediate representation (HIR) and it writes all subset constraints in the HIR to a file. After this global pass, it computes the points-to sets by iterating over all the constraints until it reaches a fixed point. Then, it stores the points-to sets in a file.

During a global pass, we also collect the identifiers of instructions that write to locations that may be read in other functions. These include writes to locations obtained by dereferencing pointers, to static and global variables, and to local variables whose address is taken. This information is also written to a file.

We compute inter-procedural reaching definitions using the points-to sets and the assignments collected during the global pass. For uses of variables and temporaries, the set of reaching definitions is the union of the set containing the identifiers of all assignments to the variable (or temporary) with the sets containing the identifiers of all assignments to dereferences or pointers that may point to the variable (or temporary). For pointer dereferences, the set of reaching definitions is the union of the set containing the identifiers of all assignments to the dereferenced pointer with the sets of reaching definitions of all the variables the pointer can point to. The sets of inter-procedural reaching definitions are written to a file that is used to instrument the program.

In this example, both the intra-procedural and the inter-procedural analyses assume that the relative layout of independent objects in memory is undefined. They assume that correct programs do not use pointer arithmetic to navigate between independent objects in memory.

Existing compilers already make this assumption when implementing several standard optimizations. Therefore, this assumption applies to the vast majority of programs. However, it is precisely this assumption that is violated by most attacks. Data-flow integrity enforcement detects and prevents these attacks.

More detail about the process of adding the data flow tracking instructions and the data flow checking instructions to the software is now given.

Instrumentation

In a particular example we add instrumentation by inserting new high-level-instructions into a high level intermediate representation of the program. For example, the instructions have the form:

SETDEF opnd id
CHECKDEF opnd setName.

It is noted that it is not essential to use this form for the instructions. Any suitable form of instructions for achieving the function of tracking the data-flow and checking the data-flow integrity can be used.

The first instruction sets the RDT entry for opnd to id. The second retrieves the runtime definition identifier for opnd from the RDT and checks if the identifier is in the reaching definitions set with name setName. The compiler or other suitable entity maintains a map from set names to set values that is used when lowering CHECKDEF instructions to the assembly language of a target machine. Instrumenting a high-level representation of the code has the advantage of making the instrumentation machinery independent of the source language and mostly independent of the target architecture.

Below is an example HIR for the example code given above with high-level instrumentation generated from the information computed by the reaching definitions analysis. The set with name 100 has the value {1,8}. In this example, we do not instrument temporaries that we can ensure are allocated to registers, and we also do not instrument the uses of &packet because addresses of local variables are computed by adding a constant to the frame pointer.

|  | SETDEF __authenticated 1 | |
| --- | --- | --- |
|  | __authenticated = ASSIGN 0 | #1 |
| $L6: | CHECKDEF __authenticated 100 | |
|  | t274 = CMP(NE) __authenticated, 0 | #2 |
|  | CBRANCH(NE) t274,$L7, $L8 | #3 |

-continued

| $L8: | tv275 = CALL &__PacketRead, &__packet | #4 |
| --- | --- | --- |
|  | t276 = CALL &__Authenticate, &__packet | #5 |
|  | t277 = CMP(NE) t276, 0 | #6 |
|  | CBRANCH(NE) t277,$L10, $L9 | #7 |
| $L10: | SETDEF __authenticated 8 | |
|  | __authenticated = ASSIGN 1 | #8 |
| $L9: | GOTO $L6 | #9 |
| $L7: | CHECKDEF __authenticated 100 | |
|  | t278 = CMP(NE) __authenticated, 0 | #10 |
|  | CBRANCH(NE) t278,$L12, $L11 | #11 |
| $l12: | tv279 = CALL &__ProcessPacket, &__packet | #12 |
| $L11: |  |  |

Before describing how the high-level instrumentation is lowered to assembly language, we describe how we implement the RDT. To enable efficient accesses, the RDT is implemented in one example as an array with a definition identifier for each 32-bit memory word in the instrumented program. Each definition identifier is two bytes long for example. This results in a space overhead of approximately 50%.

We are able to record a single identifier for each 32-bit word because we can generate code where no two variables with distinct reaching definition sets share the same aligned 32-bit memory word. Since our reaching definitions analysis does not distinguish between different fields in objects and between different elements in arrays, it is not necessary to change the layout of arrays and objects. We only change the compiler to use a minimum alignment of 32 bits when laying out local variables in a stack frame. Function arguments, globals, and heap allocated objects are appropriately aligned.

In a particular example, we allocate the lowest 1 GB of a virtual address space to the program being instrumented and 512 MB to the RDT with a guard page between them, that is, the guard page is at address 40000000h and the base of the RDT is at address 40001000h. So to compute the address of the RDT entry for an operand, we simply take the address of the operand shift it right by two, multiply the result by two, and add 40001000h. This layout also enables efficient bounds checking of the target addresses of writes to prevent tampering with the RDT. In one implementation we raise an exception if the bitwise and of the target address with c0000000h is non-zero. In another implementation we use bit masking to prevent the application from writing to the RDT. For example, we mask the target address with 3fffffffh to prevent it from referring to the RDT. The guard page allows us to check only the target address for the write and ignore the size.

The high-level instrumentation may be lowered to x86 assembly as illustrated by the following examples. We lower SETDEF authenticated 1 to:

|  | lea | ecx, [__authenticated] |
| --- | --- | --- |
|  | test | ecx, 0C0000000h |
|  | je | L |
|  | int | 3 |
| L: | shr | ecx,2 |
|  | mov | word ptr [ecx*2+40001000h],1 |

The first instruction loads the target address of the write into ecx and the following three instructions perform the bounds check on the address. If the check fails, we currently generate a breakpoint (int 3), which is very convenient for debugging. Another exception would be more appropriate in production use. The shr instruction is used to compute the address of the RDT entry for authenticated and the mov instruction updates the entry. If the size of the operand is greater than 32 bits, it is necessary to update the entries in the RDT corresponding to other words. We can update entries for 64-bit operands with a single mov instruction by moving the concatenation of two copies of the identifier. But we add additional instructions with larger operands.

The CHEKCDEF authenticated 100 instruction is lowered to:

```
        lea     ecx, [__authenticated]
        shr     ecx,2
        cmp     word ptr [ecx*2+40001000h],1
        je      L
        cmp     word ptr [ecx*2+40001000h],8
        je      L
        int     3
L:
```

This code compares the definition identifier in the RDT entry for authenticated with the definition identifiers set 100. When the operand is larger than 32 bits, we add additional comparisons for the other words.

In addition, we instrument definitions and uses of control data introduced in the compilation process. For example on function entry, we add the following code to set the RDT entry corresponding to the function's return address to zero:

```
        mov     ecx, esp
        shr     ecx,2
        cmp     word ptr [ecx*2+40001000h],0
        je      L
        int     3
L:      ret
```

Going back to our example piece of code involving PacketRead and Authenticated above, the instrumented code is no longer vulnerable to either the control-data attack that overwrites the return address or the non-control-data attack that overwrites authenticated. Since the analysis concludes that authenticated is not aliased with packet, writes to packet have identifiers that are guaranteed to be distinct from 1 or 8. Additionally, the identifier zero is only used on function entry for return addresses. Therefore, any return address overwrite would also be detected.

Programs often rely on a complex runtime environment that includes several libraries. It is often impossible to analyse the source code of these libraries. Frequently, only the binaries are available and, even when source code is available, some functions are hand-written in assembly. Yet, many attacks exploit vulnerabilities in libraries. For example, string manipulation functions in the C library are notorious for buffer overflow vulnerabilities.

Previous techniques that use source code analysis to instrument writes fail to provide any guarantees unless library calls are wrapped to perform safety checks. These previous techniques include array bounds checking and memory-safe dialects of C. Sometimes wrappers are also required to perform memory layout conversions. Writing these wrappers can be onerous.

Our data-flow integrity enforcement methods optionally do not require any library wrappers. When a program calls library functions that were not analyzed, the analysis is unable to compute reaching definition sets for some uses, but we guarantee integrity of the data-flow for all other uses. To do this, we instrument library binaries to set the RDT entries for any memory they write to an invalid definition identifier. This can be done without the source code.

We provide the option to define library wrappers to increase coverage. For example, defining a wrapper for a library function, comprises describing the subset constraints that calling the function adds to the points-to analysis and writing a wrapper function. The wrapper checks definition identifiers for the memory read by the library, calls the library, and sets definition identifiers for the memory written by the library. We instrument the code to call the wrapper instead of the original function and to supply the wrapper with reaching definition sets for the memory read by the library function and a definition identifier for the memory it writes. For example, a wrapper for the WindowNT™ operating system call CreateProcess can check the integrity of the application name and command line strings supplied as arguments.

Below is shown an example wrapper for memcpy. CHECK_BOUNDS ensures that memcpy does not write into the RDT and CHECK_ARRAY checks if the identifiers in the RDT for the bytes in src are in the reaching definitions set supplied in defArgs. The RDT entries for the bytes written to dest are set to defId by UPDATE RDT.

```
void*
Dfi_memcpy(int** defArgs, void *dest,
        const void *src, size_t count)
{
    unsigned int defId = (unsigned) defArgs [0];
    CHECK_BOUNDS (dest, count);
    CHECK_ARRAY (defArgs,1,src,count);
    memcpy (dest, src, count);
    UPDATE_RDT(dest, count, defId);
    return dest;
}
```

Optimisations

Our data-flow integrity enforcement method introduces some overheads: each definition introduces a write to the RDT and each use check introduces a read from the RDT followed by comparisons against each identifier in the set of reaching definitions for the use.

We have developed some methods to reduce this overhead. They fall into four types of method. First, we can rename definitions to reduce the number of comparisons in CHECK-DEFs or allow a batch of comparisons to be performed more cheaply. Second, we can use static analysis to remove certain SETDEFs and CHECKDEFs when it is guaranteed that removing them cannot compromise data-flow integrity. Finally, different definitions can reach a use with different frequencies at runtime. We can modify the runtime system to exploit this bias.

Renaming Definitions

A first type of optimizations attempts to restructure the definition identifier space so that CHECKDEFs can be compiled to more efficient native code.

We developed two techniques. The first technique partitions definitions into equivalence classes in a way that allows us to safely assign the same identifier to all definitions in the same class. Two definitions are equivalent if they have exactly the same set of uses. This reduces the number of comparisons in CHECKDEFs and the number of bits required to represent identifiers. For example, both definitions of authenticated in the PacketRead example have the same set of uses computed by the static analysis. We assign the same identifier 1 to both definitions. Therefore, CHECKDEF authenticated 100 requires only one comparison. It is compiled to:

```
        lea     ecx, [__authenticated]
        shr     ecx,2
        cmp     word ptr [ecx*2+40001000h],1
        je      L
```

-continued

```
        int     3
L:
```

A second type of method is to rename definitions so that comparisons against a set of identifiers can be made faster. We exploit the fact that comparisons can be performed in different ways with different costs. In one implementation three forms of comparison are possible: (i) a check against a range of consecutive identifiers 0 . . . n can be implemented by a single unsigned integer comparison against n, (ii) a check against a range of consecutive identifiers n . . . m can be implemented by subtracting n and performing an unsigned comparison against m-n, (iii) a check against a single identifier n can be implemented by an ordinary comparison. In other implementations there will be different or additional forms of check that can be performed with various costs.

We define the cost of a CHECKDEF as the number of subtractions and comparisons necessary to perform it. For instance, in the example implementation, the cost of checking {1,3,7} is three, but the cost of checking {0, 1,2} is only one. We say that the total cost of an identifier set is the cost of a single CHECKDEF against it, multiplied by the number of CHECKDEFs against it that occur in the program. In the example implementation we use a static count of the number of occurrences. Those skilled in the art will realize that other implementations may use other techniques such as static heuristics to estimate the number of CHECKDEFs executed, or runtime feedback to count or estimate the number of CHECKDEFs executed.

We use heuristics to attempt to reduce the sum of the total costs of all sets. A particular example uses a simple greedy algorithm: we sort the sets in order of decreasing total cost and proceed to assign the most costly sets to contiguous identifier ranges. We start from identifier 0 and so the set with the largest total cost benefits from the cheapest comparisons.

Removing Bounds Checks

We check the target addresses of writes to prevent the attacker from tampering with the RDT. We can optimize SETDEFs by removing those checks from all writes that we can determine to be safe statically. In a particular example, a write is safe if the target address is obtained by adding a small constant offset (possibly zero) to the stack pointer, frame pointer, or to the address of a global or static variable. Preferably, but not essentially, the sum of the offset and the size of the data being written to is less than 4KB (which is the size of the guard page that we allocate before the RDT).

For example, in the PacketRead example, since authenticated is a local variable whose address is obtained by adding a small constant to the frame pointer, we can remove the bounds check from SETDEF authenticated1. the SETDEF is compiled to:

```
    lea     ecx, [_authenticated]
    shr     ecx,2
    mov     word ptr [ecx*2+40001000h],1
```

Removing SETDEFs and CHECKDEFs

Another type of optimizations uses static analysis to safely remove some SETDEFs and CHECKDEFs.

Of course, we must be careful about what we mean by safely. There are two problems. First, we aim not to rely on high level analyses whose inferences are unsound once data flow integrity has been lost: the entire purpose of the instrumentation is to detect cases where the program's data flow integrity is compromised. Second, we aim not to remove checks too early during compilation because later code transformations may change the situations in which data flow integrity is lost. Therefore, we optionally perform our optimizations when SETDEF and CHECKDEF operations are still present in their HIR form but the remainder of the program has already been lowered to the native instruction set and is ready to emit.

The first technique identifies local variables that have no definitions outside the function and that are written only by safe writes (according to the definition of safe in the previous section). It replaces all SETDEFs for such a variable by a single SETDEF with identifier 0 that is placed on function entry. It also simplifies CHECKDEFs for such variables to have a reaching definitions set equal to {0}. This optimization is safe because safe writes cannot violate data-flow integrity. Therefore, only one SETDEF is necessary.

A second technique runs data-flow analysis to remove SETDEFs and CHECKDEFs. This analysis is similar to the reaching definitions analysis that we use to compute the static data-flow graph but it does not rely on assumptions that can be violated by the attacker. For simplicity, we will describe the case of instruction sequences within the same basic block. This technique also deals with the case of propagating flow variables across distinct basic blocks on arbitrary control-flow graphs.

Our instrumentation is redundant in the following cases. Suppose that instructions I1 and I2 are a pair of SETDEFs or CHECKDEFs relating to the same data that execute without any intervening write to that data.

1. If I1 and I2 are both SETDEFs with the same identifier then I2 is redundant.
2. If I1 and I2 are both SETDEFs with no intervening CHECKDEF for that data then I1 is redundant.
3. If I1 is a SETDEF for ID1 and I2 a CHECKDEF for a set containing ID1 then I2 is redundant (indeed, ID1 must be in I2's set if the data flow analysis was performed correctly).
4. If I1 and I2 are both CHECKDEFs against sets IDS1 and IDS2 respectively then IDS2 can be reduced to contain only elements in IDS1 (the earlier check guarantees no other elements are present). Furthermore, if IDS1 and IDS2 hold identical elements then I2 can be removed (it is not possible for the latter check to fail if the earlier check succeeds).
5. If I1 is a CHECKDEF against set IDS1 and I2 a SETDEF for ID2 then I2 is redundant if IDS1={I2}.

In practice rules 3 and 4 are the most effective. Rule 3 eliminates many CHECKDEF instructions when uses of data occur close to their definitions. Rule 4 lets us remove CHECKDEF instructions where the same data is used repeatedly, even if there are aliasing writes between the data's definition and the first of those uses.

To identify redundant instrumentation, we use symbolic execution of the native code augmented with SETDEF and CHECKDEF operations. We update the symbolic state of the registers after each instruction and the symbolic state of the RDT after SETDEFs and CHECKDEFs. The symbolic state of the RDT maps symbolic memory addresses to sets of definition identifiers.

In one example we use a simple test to compare symbolic addresses. Two addresses are equal if they are syntactically equal. They are different if they are computed by adding different offsets to the same symbolic register state. Otherwise, they may refer to aliased memory locations. A write to memory invalidates the symbolic state of a register if the state refers to the contents of a memory position that may be aliased with the write's target. Additionally, it removes mappings for any memory that may be aliased with the write's target from the symbolic RDT state.

We apply the rules to eliminate redundant instrumentation by examining the symbolic RDT state. Since we work on a single basic block at a time we immediately remove instructions where they are redundant—this could readily be moved to a separate pass in an inter-block implementation.

Exploiting Biased Data Flows

Our final technique is based on the anticipation that different definitions can reach a use with different frequencies at runtime. For instance, in the following example, definition D1 reaches line 3 only on the first iteration on the loop:

```
1: int x = ...; // D1
2: for (int y = 0; y < 100; y ++)
3: x ++;      // D2
4: }
```

We optionally add a second global table that maps addresses to the definition identifier most recently seen at them. Then, for any CHECKDEF against a set with greater-than-2 cost, we precede the check by a comparison against the value held in the table. If it matches then the check is guaranteed to succeed. If it fails, then we update the table and proceed with the check.

Alternatively, we can reorder the membership checks using profiling information such that checks for definition identifiers that reach the use more frequently are performed first. The profiling information can be gathered during profiling runs of the program and the checks can be re-ordered when the program is compiled. Alternatively, the profiling information can be gathered during normal runs of the program, and the checks can be dynamically re-ordered while the program runs.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
   (i) providing access to the results of a static analysis of a software program the static analysis results comprising data flow information, the static analysis including a set of reaching defintion identifiers associated with a use, the set of reaching definition identifiers including a first reaching definition that cannot reach the use at runtime;
   (ii) forming data-flow tracking instructions in order to track data flow within the software;
   (iii) forming checking instructions in order to check the tracked data flow against the static analysis results and thereby identify potential flaws in the software program, the checking instructions using a first memory area associated with a second memory area associated with the software program, a plurality of memory addresses of the second memory area being associated with a plurality of memory addresses of the first memory area, the plurality of memory addresses of the first memory area storing instruction indicators indicating an instruction that most recently wrote to a corresponding address in the second plurality of memory addresses;
   (iv) establishing a guard page between the first and second memory areas, each memory address of the plurality of memory addresses of the first memory area being computable by bit shifting the corresponding address in the second plurality of memory addresses by a first constant, multiplying the result by a second constant, and adding a third constant; and
   (v) adding the data-flow tracking instructions and the checking instructions to the software.

2. A method as claimed in claim 1, wherein the data-flow tracking instructions and the checking instructions are formed and added to the software using any of a modified compiler and a binary re-write tool.

3. A method as claimed in claim 1, wherein the data-flow tracking instructions and the checking instructions are implemented using any of a machine emulator arranged to emulate a processor executing the software program and a hardware equivalent of the machine emulator.

4. A method as claimed in claim 1, wherein said potential flaws comprise both control-data attacks and non-control-data attacks.

5. A method as claimed in claim 1, wherein the static analysis results comprise, for each value read by an instruction in the software program, a set of instructions from the software program that may write that value.

6. A method as claimed in claim 1, which further comprises carrying out the static analysis of the software program by computing reaching definitions from source code of the software program.

7. A method as claimed in claim 1, wherein the data flow tracking instructions are arranged to maintain a mapping between identifiers and memory positions, the identifiers being of the last instruction to write to each of the memory positions.

8. A method as claimed in claim 1, wherein the checking instructions are associated with read instructions.

9. A method as claimed in claim 6, wherein a checking instruction associated with a read instruction is arranged to check if an identifier of the instruction that wrote the value being read by the authorised read instruction is an element of an associated set computed by the static analysis.

10. A method as claimed in claim 5, which further comprises determining equivalence classes of instructions and assigning the same identifier to all the instructions in the same class.

11. A method as claimed in claim 1, which further comprises removing some of the data-flow tracking instructions and some of the checking instructions on the basis of a second static analysis.

12. A method as claimed in claim 1, which further comprises carrying out the static analysis of the software program by computing reaching definitions and renaming at least some of those reaching definitions in order to improve the performance of a process of making checks against those reaching definitions.

13. A method comprising:
(i) accessing the results of a static analysis of a software program the static analysis results comprising data flow information, the data flow information including one or more value locations and a set of program locations of the program that may write a value for each of the one or more value locations, the set of program locations including one or more program locations of the program that cannot write the value at runtime;
(ii) tracking data flow in the software program during execution or emulation of that software program; and
(iii) checking the tracked data flow against the static analysis results and raising an exception if a mismatch is found, the mismatch being associated with at least a control-data attack or a non-control data attack, the checking comprising separating a first virtual address space from a second virtual address space associated with the first virtual address space using a guard page, an address of the first virtual address space being computable by bit shifting an address of the second virtual address space by a first constant, multiplying the result by a second constant, and adding a third constant, the second virtual address space being used by the software program.

14. A computer-readable storage medium, the computer-readable storage medium being hardware, containing computer-executable instructions comprising:
(i) computer-executable instructions to provide access to the results of a static analysis of a software program the static analysis results comprising data flow information;
(ii) computer-executable instructions to form data-flow tracking instructions in order to track data flow within the software;
(iii) computer-executable instructions to form checking instructions in order to check the tracked data flow against the static analysis results and thereby identify potential flaws in the software program, the potential flaws being associated with at least a control-data attack or a non-control data attack, the checking instructions using a first memory area associated with a second memory area associated with the software program, a plurality of memory addresses of the second memory area being associated with a plurality of memory addresses of the first memory area, the plurality of memory addresses of the first memory area storing instruction indicators indicating an instruction that most recently wrote to a corresponding address in the second plurality of memory addresses; and
(iv) computer-executable instructions to establish a guard page between the first and second memory areas, each memory address of the plurality of memory addresses of the first memory area being computable by bit shifting the corresponding address in the second plurality of memory addresses by a first constant, multiplying the result by a second constant, and adding a third constant.

15. A computer readable storage medium, the computer readable storage medium being hardware, containing computer-executable instructions comprising:
(i) computer-executable instructions to access the results of a static analysis of a software program the static analysis results comprising data flow information, the static analysis including a set of reaching defintion identifiers associated with a use, the set of reaching definition identifiers including a first reaching definition that cannot reach the use at runtime;
(ii) computer-executable instructions to add tracking data flow instructions to the software program;
(iii) computer-executable instructions to track data flow in the software program during execution or emulation of that software program; and
(iv) computer-executable instructions to check the tracked data flow against the static analysis results and raising an exception if a mismatch is found, the mismatch being associated with at least a control-data attack or a non-control data attack, the checking comprising separating a first virtual address space from a second virtual address space associated with the first virtual address space using a guard page, an address of the first virtual address space being computable by bit shifting an address of the second virtual address space by a first constant, multiplying the result by a second constant, and adding a third constant, the second virtual address space being used by the software program.

16. An apparatus comprising:
(i) an input arranged to access the results of a static analysis of a software program the static analysis results comprising data flow information;
(ii) a processor arranged to form data-flow tracking instructions in order to track data flow within the software;
(iii) a processor arranged to form checking instructions in order to check the tracked data flow against the static analysis results and thereby identify potential flaws in the software program, the potential flaws being associated with at least a control-data attack or a non-control data attack, the checking instructions using a first memory area associated with a second memory area associated with the software program, a plurality of memory addresses of the second memory area being associated with a plurality of memory addresses of the first memory area, the plurality of memory addresses of the first memory area storing instruction indicators indicating an instruction that most recently wrote to a corresponding address in the second plurality of memory addresses; and
(iv) a processor arranged to establish a guard page between the first and second memory areas, each memory address of the plurality of memory addresses of the first memory area being computable by bit shifting the corresponding address in the second plurality of memory addresses by a first constant, multiplying the result by a second constant, and adding a third constant.

17. An apparatus as claimed in claim 16, which further comprises a compiler arranged to carrying out the static analysis of the software program by computing reaching definitions from source code of the software program.

18. An apparatus as claimed in claim 16, wherein the processor is arranged to form the data flow tracking instructions in order to maintain a mapping between identifiers and memory positions, the identifiers being of the last instruction to write to each of the memory positions.

19. An apparatus as claimed in claim 18, wherein the processor is arranged to form the checking instructions for each read instruction to check if an identifier of the instruction that wrote the value being read is an element of an associated set computed by the static analysis.

20. An apparatus comprising:
(i) an input arranged to access the results of a static analysis of a software program the static analysis results comprising data flow information, the static analysis including a set of reaching defintion identifiers associated with a use, the set of reaching definition identifiers including a first reaching definition that cannot reach the use at runtime;
(ii) a processor arranged to track data flow in the software program during execution of the software program using data flow tracking instructions inserted into the software program; and
(iii) wherein the processor is also arranged to check the tracked data flow against the static analysis results and raise an exception if a mismatch is found, the mismatch being associated with at least a control-data attack or a non-control data attack, the checking comprising separating a first virtual address space from a second virtual address space associated with the first virtual address space using a guard page, an address of the first virtual address space being computable by bit shifting an address of the second virtual address space by a first constant, multiplying the result by a second constant, and adding a third constant, the second virtual address space being used by the software program.

* * * * *